US008868814B2

(12) United States Patent
Higuchi et al.

(10) Patent No.: US 8,868,814 B2
(45) Date of Patent: Oct. 21, 2014

(54) I/O SYSTEM, DOWNSTREAM PCI EXPRESS BRIDGE, INTERFACE SHARING METHOD, AND PROGRAM

(75) Inventors: Junichi Higuchi, Tokyo (JP); Youichi Hidaka, Tokyo (JP); Jun Suzuki, Tokyo (JP); Takashi Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 361 days.

(21) Appl. No.: 13/382,262

(22) PCT Filed: Jun. 11, 2010

(86) PCT No.: PCT/JP2010/003903
§ 371 (c)(1),
(2), (4) Date: Jan. 4, 2012

(87) PCT Pub. No.: WO2011/004548
PCT Pub. Date: Jan. 13, 2011

(65) Prior Publication Data
US 2012/0110233 A1 May 3, 2012

(30) Foreign Application Priority Data

Jul. 6, 2009 (JP) ................. P2009-159704

(51) Int. Cl.
G06F 13/20 (2006.01)
G06F 13/36 (2006.01)
G06F 13/40 (2006.01)

(52) U.S. Cl.
CPC .... *G06F 13/4022* (2013.01); *G06F 2213/0026* (2013.01)
USPC .......................................... 710/313; 710/314

(58) Field of Classification Search
USPC ........................................ 710/313, 104, 314
See application file for complete search history.

(56) References Cited

U.S. PATENT DOCUMENTS

2007/0198763 A1* 8/2007 Suzuki et al. ................. 710/316
2007/0239925 A1* 10/2007 Koishi .......................... 710/316
2008/0071961 A1 3/2008 Higuchi et al.

(Continued)

FOREIGN PATENT DOCUMENTS

| JP | 2007-219873 A | 8/2007 |
| JP | 2007-280237 A | 10/2007 |
| JP | 2008-078887 A | 4/2008 |

OTHER PUBLICATIONS

Multi-Root I/O Virtualization and Sharing Specification Revision 1.0, PCI-SIG, May 12, 2008, pp. 27-28.

(Continued)

*Primary Examiner* — Nimesh G Patel
(74) *Attorney, Agent, or Firm* — McGinn IP Law Group, PLLC

(57) ABSTRACT

Fault tolerance is improved, a functional limitation at the time of start-up of an I/O system is avoided, and a start-up time is shortened. A downstream PCI Express bridge sets a PCI Express device connected to the downstream PCI Express bridge itself, among a plurality of single root-compatible PCI Express devices shared by a plurality of root complexes connected to a plurality of upstream PCI Express bridges that exchange data with the downstream PC Express bridge itself through a network, controls and monitors a state of a physical link with the PCI Express device connected to the downstream PCI Express bridge itself, and performs monitoring and notification of an error of the PCI Express device connected to the downstream PCI Express bridge itself.

11 Claims, 9 Drawing Sheets

(56) References Cited

U.S. PATENT DOCUMENTS

| | | | |
|---|---|---|---|
| 2010/0115329 A1* | 5/2010 | Tanaka et al. | 714/5 |
| 2010/0153592 A1* | 6/2010 | Freimuth et al. | 710/38 |
| 2010/0165874 A1* | 7/2010 | Brown et al. | 370/254 |
| 2010/0232443 A1* | 9/2010 | Pandey | 370/401 |
| 2011/0153906 A1 | 6/2011 | Suzuki et al. | |

OTHER PUBLICATIONS

Single-Root I/O Virtualization and Sharing Specification Revision 1.0, PCI-SIG, Sep. 11, 2007, pp. 11-18.

International Search Report in PCT/JP2010/003903 dated Sep. 7, 2010 (English Translation Thereof).

Alex Umansky, Software-Hardware Interoperability in Multi-GPU Systems, PCI-SIG Developers Conference Europe 2009 Mar. 2009, PCI-SIG, Mar. 2009, pp. 1 to 29 URL, http://www.pcisig.com/developers/main/training_materials/get_document?doc_id=353c4ff96999810a0ba4244538f3d9e6f4da2442 (Previously submitted on Oct. 28, 2013).

Renato Recio, Single Root Resource Discovery and Allocation, I/O Virtualization Interactive Technology Assessment Nov. 2006, U.S.A., PCI-SIG, Nov. 2006, pp. 1-25, [online] Internet <Search Date: Mar. 17, 2014>, URL, http://www.pcisig.com/developers/main/training_materials/get_document?doc_id=ddb8714fla984d62dde4c257e46fcc84248fc481.

Alex Umansky, Software-Hardware Interoperability in Multi-GPU Systems, PCI-SIG Developers Conference Europe 2009 Mar. 2009, PCI-SIG, Mar. 2009, pp. 1 to 29 URL, http://www.pcisig.com/developers/main/training_materials/get_document?doc_id=353c4ff96999810a0ba4244538f3d9e6f4da2442.

Japanese Office Action dated Jul. 30, 2013, with English translation.

* cited by examiner

US 8,868,814 B2

I/O SYSTEM, DOWNSTREAM PCI EXPRESS BRIDGE, INTERFACE SHARING METHOD, AND PROGRAM

TECHNICAL FIELD

The present invention relates to an input/output (I/O) system, a downstream peripheral component interconnect (PCI) Express bridge, an interface sharing method, and a program. In particular, the present invention relates to technology for sharing a PCI Express device between a plurality of central processing units (CPUs) and a plurality of root complexes (RCs).

BACKGROUND ART

As a method for sharing a PCI Express device among a plurality of RCs, PCI-Special Interest Group (SIG), which is an industry standardization organization, has standardized multi-root I/O virtualization (MR-IOV) (for example, refer to Non-Patent Document 1).

FIG. 10 is a block diagram illustrating a basic configuration of MR-IOV. The MR-IOV is configured by a plurality of CPU/RCs 10-1, a multi-root aware PCI Express (PCIe) switch (MRA-SW) 10-2, a plurality of multi-root aware PCIe devices (MRA-DEVs) 10-3, and an MR-PCI manager (MR-PCIM) 10-4.

The MR-PCIM 10-4 is arranged on one of the CPU/RCs 10-1. Furthermore, the MR-PCIM 10-4 finds the topology and devices of the entire MR-IOV system, and sets the MRA-SW 10-2 based on a result thereof. Moreover, the MR-PCIM 10-4 sets the MRA-DEVs 10-3. As a result, the MRA-DEVs 10-3 can be simultaneously shared and used among the plurality of CPU/RCs 10-1.

PRIOR ART DOCUMENT

Non-Patent Document

Non-Patent Document 1: Multi-Root I/O Virtualization and Sharing Specification Revision 1.0, PCI-SIG, May 12, 2008, pp. 27-28

DISCLOSURE OF THE INVENTION

Problems to be Solved by the Invention

However, in the above-mentioned MR-IOV system, the MR-PCIM 10-4 mounted in the CPU/RCs' 10-1 side concentrically performs control. Therefore, there is a problem in that if access to the MR-PCIM 10-4 is limited due to a fault or the like, the entire system enters a failure state.

Furthermore, if the MRA-SW 10-2 is not set, the MRA-DEVs 10-3 cannot be set. Therefore, there is a problem in that a device such as a graphic card cannot be used from the time of start-up of a basic input/output system (BIOS).

Moreover, since the setting of the MR-PCIM 10-4 is complex, there is a problem in that a start-up time is long and implementation cost is high.

The present invention has been made in view of the above-described circumstances, and an exemplary object thereof is to provide an I/O system, a downstream PCI Express bridge, an interface sharing method, and a program, which can avoid a functional limitation at the time of start-up of an I/O system in which an I/O device is shared by a plurality of CPU/RCs and shorten a start-up time by improving fault tolerance in the I/O system.

Means for Solving the Problems

To solve the above-described problems, the present invention provides an I/O system which includes: a plurality of single root-compatible PCI Express devices; a plurality of root complexes which share the plurality of PCI Express devices; a plurality of upstream PCI Express bridges connected to the plurality of root complexes, respectively; a plurality of downstream PCI Express bridges connected to the plurality of PCI Express devices, respectively; and a network through which data is exchanged between the plurality of upstream PCI Express bridges and the plurality of downstream PCI Express bridges, wherein each of the plurality of downstream PCI Express bridges includes: a device control means which sets each PCI Express device connected to each of the plurality of downstream PCI Express bridges itself; a physical link control and monitoring means which controls and monitors a state of a physical link with each PCI Express device connected to each of the plurality of downstream PCI Express bridges itself; and an error monitoring processing means which performs monitoring and notification of an error of each PCI Express device connected to each of the plurality of downstream PCI Express bridges itself.

Moreover, the present invention provides a downstream PCI Express bridge which includes: a device control means which sets a PCI Express device connected to the downstream PCI Express bridge itself, among a plurality of single root-compatible PCI Express devices shared by a plurality of root complexes connected to a plurality of upstream PCI Express bridges that exchange data with the downstream PCI Express bridge itself through a network; a physical link control and monitoring means which controls and monitors a state of a physical link with the PCI Express device connected to the downstream PCI Express bridge itself; and an error monitoring processing means which performs monitoring and notification of an error of the PCI Express device connected to the downstream PCI Express bridge itself.

Moreover, the present invention provides an interface sharing method which includes: setting, in an I/O system in which a plurality of single root-compatible PCI Express devices are shared between a plurality of root complexes, and a virtual multi-root PCI Express switch is configured by a plurality of upstream PCI Express bridges respectively connected to the plurality of root complexes, a plurality of downstream PCI Express bridges respectively connected to the plurality of PCI Express devices, and a network through which data is exchanged between the plurality of upstream PCI Express bridges and the plurality of downstream PCI Express bridges, by each of the plurality of downstream PCI Express bridges, each PCI Express device connected to each of the plurality of downstream PCI Express bridges itself; controlling and monitoring, by each of the plurality of downstream PCI Express bridges, a state of a physical link with each PCI Express device connected to each of the plurality of downstream PCI Express bridges itself; and performing, by each of the plurality of downstream PCI Express bridges, monitoring and notification of an error of each PCI Express device connected to each of the plurality of downstream PCI Express bridges itself.

Moreover, the present invention provides a program that causes a computer of an I/O system in which a virtual multi-root PCI Express switch is configured by a plurality of upstream PCI Express bridges respectively connected to a plurality of root complexes, a plurality of downstream PCI Express bridges respectively connected to a plurality of single root-compatible PCI Express devices, and a network through which data is exchanged between the plurality of upstream PCI Express bridges and the plurality of downstream PCI Express bridges, and the plurality of PCI Express devices are shared between the plurality of root complexes, to perform: a device control function in which each of the plurality of downstream PCI Express bridges sets each PCI Express device connected to each of the plurality of downstream PCI Express bridges itself; a physical link control and monitoring function in which each of the plurality of downstream PCI Express bridges controls and monitors a state of a physical link with each PCI Express device connected to each of the plurality of downstream PCI Express bridges itself; and an error monitoring processing function in which each of the plurality of downstream PCI Express bridges performs monitoring and notification of an error of each PCI Express device connected to each of the plurality of downstream PCI Express bridges itself.

Effects of the Invention

According to the present invention, in an I/O system in which an I/O device is shared by a plurality of CPU/RCs, it is possible to improve fault tolerance, avoid a functional limitation at the time of start-up of the I/O system, and shorten a start-up time.

MODE FOR CARRYING OUT THE INVENTION

Hereinafter, an exemplary embodiment of the present invention will be described with reference to the drawings.

Figure 1:
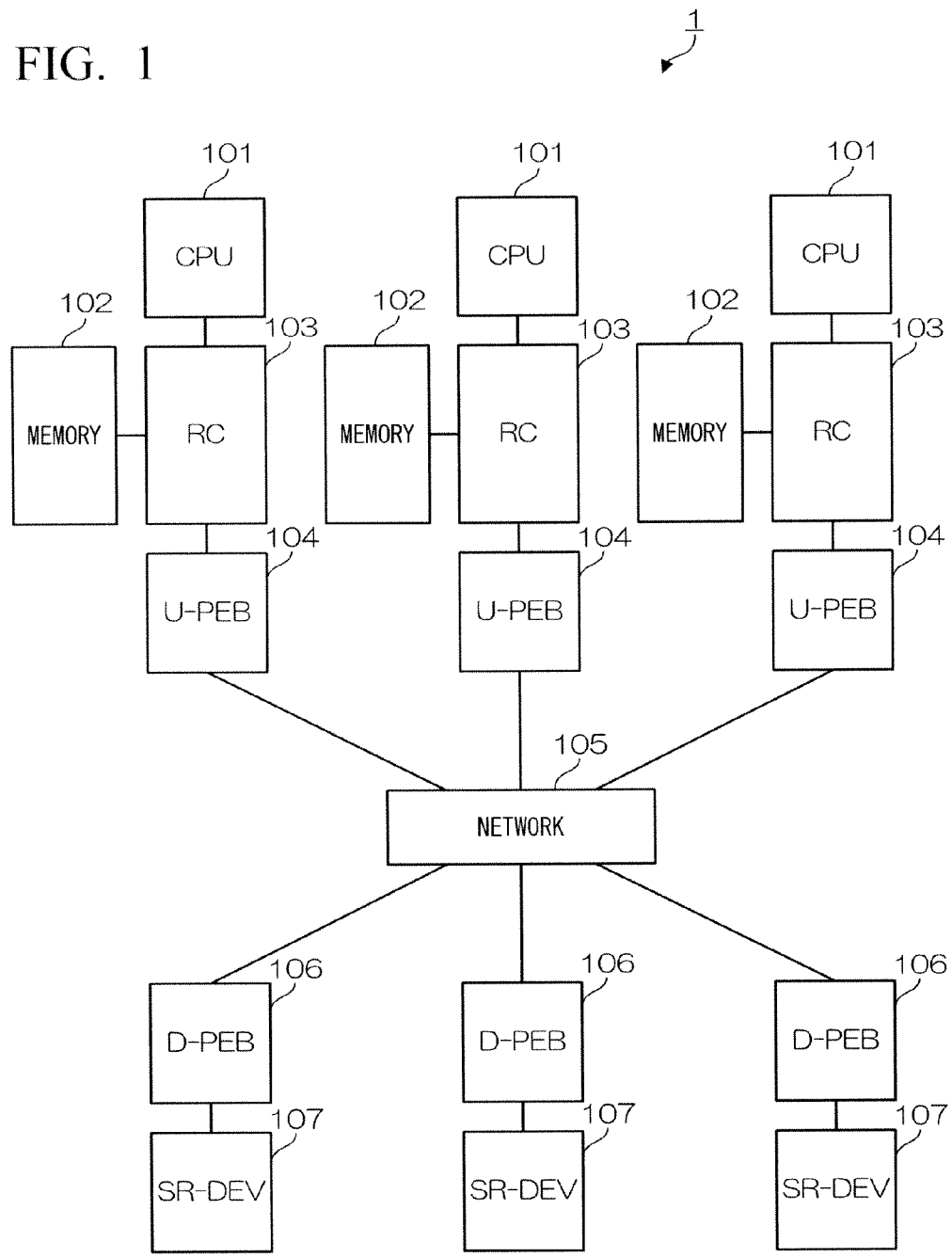
FIG. 1 is a block diagram illustrating an entire configuration of an I/O system in accordance with an exemplary embodiment of the present invention.

FIG. 1 is a block diagram illustrating an entire configuration of an I/O system in accordance with an exemplary embodiment of the present invention. In FIG. 1, an I/O system 1 is configured by a plurality of CPUs 101, a plurality of memories 102, a plurality of RCs 103, a plurality of upstream-side PCI Express bridges (U-PEBs) 104, a network 105, a plurality of downstream-side PCI Express bridges (D-PEBs) 106, and a plurality of single-root devices (SR-DEVs) 107.

It is to be noted that the SR-DEV 107 is a single-root I/O virtualization (SR-IOV)-compatible device, and the details thereof are disclosed in a reference document (Single-Root I/O Virtualization and Sharing Specification Revision 1.0, PCI-SIG Sep. 11, 2007, pp. 11-18).

The RC 103 is connected to one or a plurality of CPUs 101 (one CPU 101 in FIG. 1), one or a plurality of memories 102 (one memory 102 in FIG. 1), and one or a plurality of U-PEBs 104 (one U-PEB 104 in FIG. 1). The U-PEBs 104 are connected to the RCs 103 and the network 105. The network 105 is connected to the U-PEBs 104 and the D-PEBs 106. The D-PEBs 106 are connected to the network 105 and the SR-DEVs 107. As an example of the network 105, there is an Ethernet (a registered trademark), InfiniBand, a fiber channel, or the like.

In the present exemplary embodiment, the plurality of U-PEBs 104, the plurality of D-PEBs 106, and the network 105 constitute a virtual multi-root PCI Express switch (virtual MR-SW).

Figure 2:
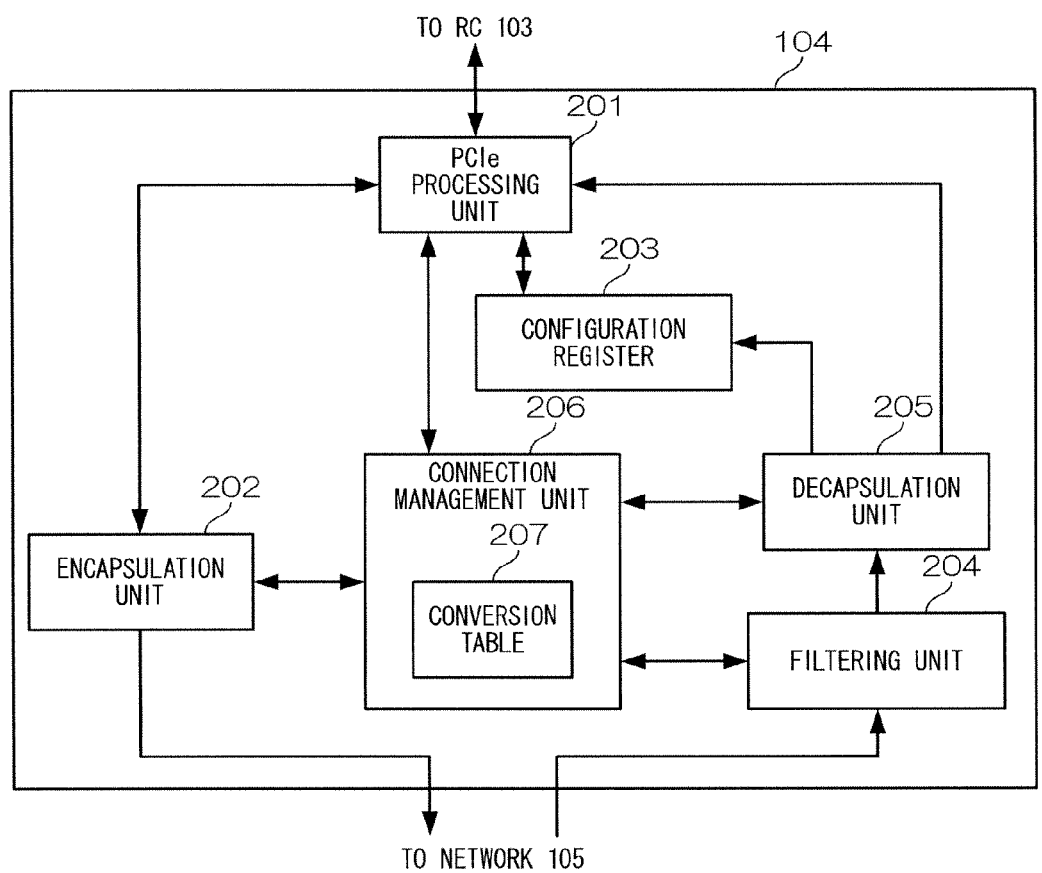
FIG. 2 is a block diagram illustrating a configuration of a U-PEB in accordance with the present exemplary embodiment.

FIG. 2 is a block diagram illustrating a configuration of the U-PEB 104 of the present exemplary embodiment. The U-PEB 104 is configured by a PCI Express (PCIe) processing unit 201, an encapsulation unit 202, a configuration register 203, a filtering unit 204, a decapsulation unit 205, and a connection management unit 206.

The PCIe processing unit 201 is connected to the RC 103, the encapsulation unit 202, the configuration register 203, the decapsulation unit 205, and the connection management unit 206. The encapsulation unit 202 is connected to the network 105, the PCIe processing unit 201, and the connection management unit 206. The configuration register 203 is connected to the PCIe processing unit 201 and the decapsulation unit 205. The filtering unit 204 is connected to the network 105, the decapsulation unit 205, and the connection management unit 206. The decapsulation unit 205 is connected to the PCIe processing unit 201, the configuration register 203, the filtering unit 204, and the connection management unit 206. The connection management unit 206 includes a conversion table 207, and is connected to the PCIe processing unit 201, the encapsulation unit 202, the filtering unit 204, and the decapsulation unit 205.

The PCIe processing unit 201 performs a switch port process at a PCIe upstream-side and reads a destination of a PCIe packet. The encapsulation unit 202 converts the PCIe packet into a transfer format of the network 105 in accordance with an instruction of the connection management unit 206 with reference to the conversion table 207. The configuration register 203 records the setting of the U-PEB 104.

The filtering unit 204 reads an identifier of an encapsulated frame from the network 105, and filters encapsulated frames other than those addressed to its own node. The decapsulation unit 205 reads a destination of the encapsulated frame, analyzes a transfer destination, decapsulates the encapsulated frame from the analysis result, and transfers the decapsulated frame to the PCIe processing unit 201, the configuration register 203, or the connection management unit 206. The connection management unit 206 manages connections with the plurality of D-PEBs 106. The conversion table 207 is a table used for performing conversion between a PCI Express space set by an operating system (OS) and an address space on the network 105.

Figure 3:
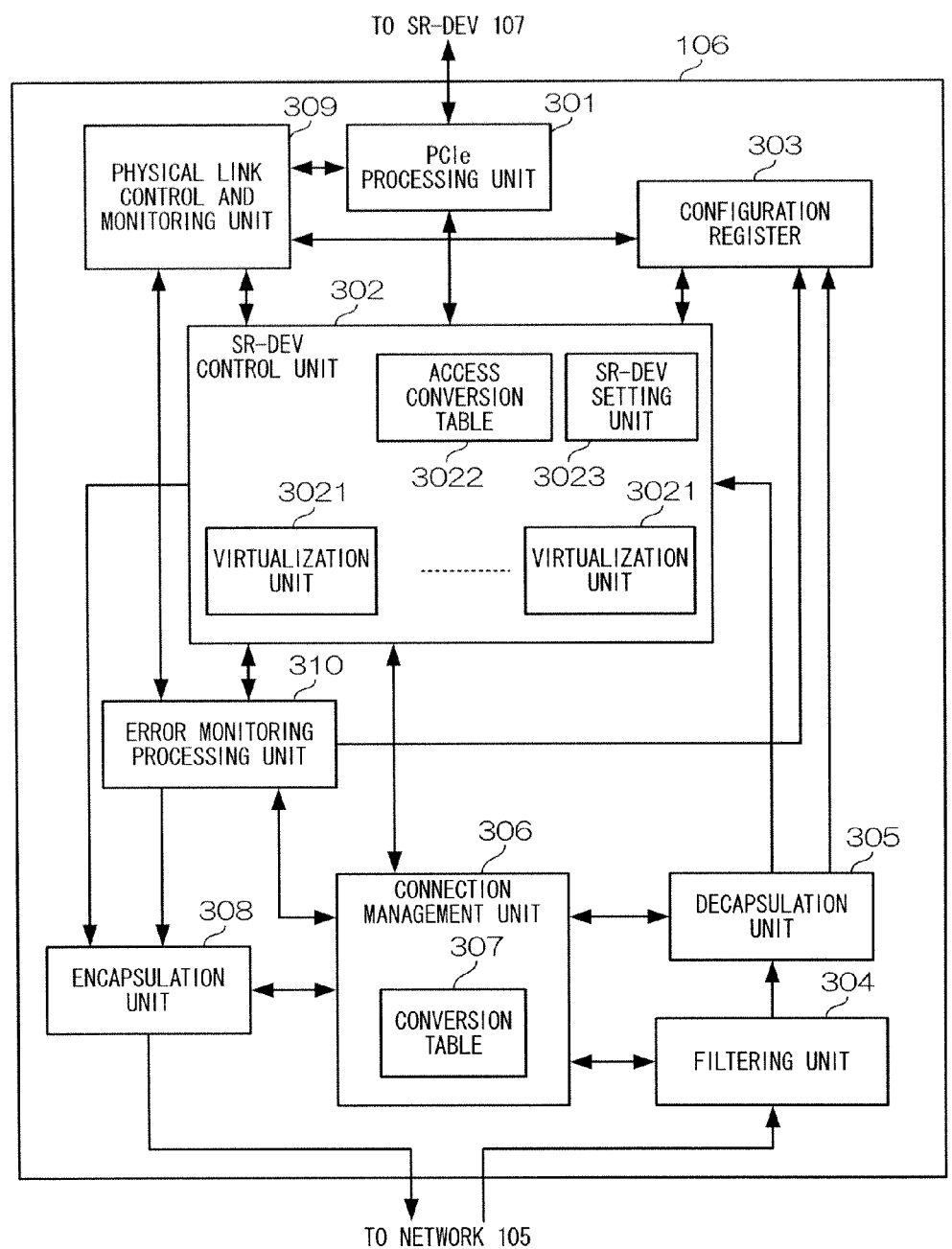
FIG. 3 is a block diagram illustrating a configuration of a D-PEB in accordance with the present exemplary embodiment.

FIG. 3 is a block diagram illustrating a configuration of the D-PEB 106 of the present exemplary embodiment. The D-PEB 106 is configured by a PCIe processing unit 301, an SR-DEV control unit 302, a configuration register 303, a filtering unit 304, a decapsulation unit 305, a connection management unit 306, an encapsulation unit 308, a physical link control and monitoring unit 309, and an error monitoring processing unit 310. It is to be noted that the SR-DEV control unit 302 may be generally called a device control means that performs a device control function. Furthermore, the physical link control and monitoring unit 309 may be generally called a physical link control and monitoring means that performs a physical link control and monitoring function. Moreover, the error monitoring processing unit 310 may be generally called an error monitoring processing means that performs an error monitoring processing function.

The PCIe processing unit 301 is connected to the SR-DEV 107, the SR-DEV control unit 302, and the physical link control and monitoring unit 309. The SR-DEV control unit 302 includes virtualization units 3021, an access conversion table 3022, and an SR-DEV setting unit 3023. The SR-DEV control unit 302 is connected to the PCIe processing unit 301, the configuration register 303, the decapsulation unit 305, the connection management unit 306, the physical link control and monitoring unit 309, and the error monitoring processing unit 310. The configuration register 303 is connected to the SR-DEV control unit 302, the decapsulation unit 305, the physical link control and monitoring unit 309, and the error monitoring processing unit 310.

The filtering unit 304 is connected to the network 105, the decapsulation unit 305, and the connection management unit 306. The decapsulation unit 305 is connected to the SR-DEV control unit 302, the configuration register 303, the filtering unit 304, and the connection management unit 306. The connection management unit 306 includes a conversion table 307, and is connected to the SR-DEV control unit 302, the filtering unit 304, the decapsulation unit 305, the encapsulation unit 308, and the error monitoring processing unit 310.

The encapsulation unit 308 is connected to the network 105, the SR-DEV control unit 302, the connection management unit 306, and the error monitoring processing unit 310. The physical link control and monitoring unit 309 is connected to the PCIe processing unit 301, the SR-DEV control unit 302, the configuration register 303, and the error monitoring processing unit 310. The error monitoring processing unit 310 is connected to the SR-DEV control unit 302, the configuration register 303, the connection management unit 306, the encapsulation unit 308, and the physical link control and monitoring unit 309.

The PCIe processing unit 301 performs a switch port process at a PCI Express downstream-side. The SR-DEV control unit 302 controls the SR-DEVs 107. In the SR-DEV control unit 302, the virtualization unit 3021 allows a virtual function (VF) 4022 (which will be described later) of the SR-DEV 107 allocated to an arbitrary RC 103 to be seen to a normal PCI Express device. The access conversion table 3022 is used for performing access conversion to the VF 4022 of the SR-DEV 107 allocated to the arbitrary RC 103. The SR-DEV setting unit 3023 sets a physical function (PF) 4021 (which will be described later) and the VF 4022 of the SR-DEV 107. It is to be noted that the physical function (PF) and the virtual function (VF) are described, for example, in the aforementioned reference document.

The configuration register 303 records the setting of the D-PEB 106. The filtering unit 304 reads an identifier of an encapsulated frame from the network 105, and filters encapsulated frames other than those addressed to its own node. The decapsulation unit 305 reads a destination of the encapsulated frame, analyzes a transfer destination, decapsulates the encapsulated frame from the analysis result, and transfers the decapsulated frame to the SR-DEV control unit 302, the configuration register 303, or the connection management unit 306.

The connection management unit 306 manages connections with the plurality of U-PEBs 104. In the connection management unit 306, the conversion table 307 is a table used for performing conversion between the PCI Express space set by the OS and the address space on the network 105. The encapsulation unit 308 converts a PCIe packet into the transfer format of the network 105 in accordance with an instruction of the connection management unit 306 with reference to the conversion table 307. The physical link control and monitoring unit 309 controls and monitors physical links with the SR-DEVs 107. The error monitoring processing unit 310 monitors error information of the SR-DEV 107, and notifies the U-PEBs 104, or the CPU 101s and the RC 103s of the error information depending on an error status.

Figure 4:
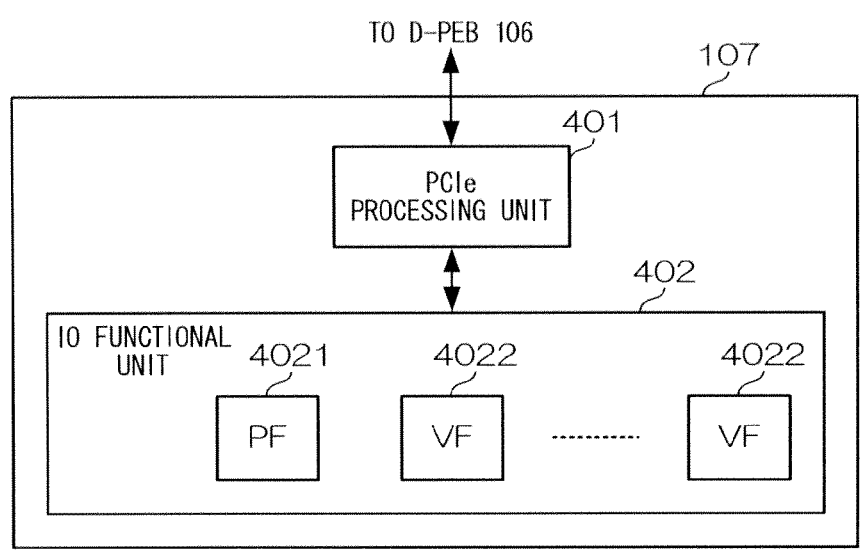
FIG. 4 is a block diagram illustrating a configuration of an SR-DEV in accordance with the present exemplary embodiment.

FIG. 4 is a block diagram illustrating a configuration of the SR-DEV 107 of the present exemplary embodiment. The SR-DEV 107 is an SR-IOV-compatible PCI Express device. FIG. 4 illustrates only functional blocks necessary for explaining the present invention. The SR-DEV 107 is configured by a PCIe processing unit 401 and an IO functional unit 402. The PCIe processing unit 401 is connected to the D-PEB 106 and the IO functional unit 402. The IO functional unit 402 includes a PF 4021 and VFs 4022, and is connected to the PCIe processing unit 401.

Next, the operation of the I/O system of the present exemplary embodiment will be described.

Figure 5:
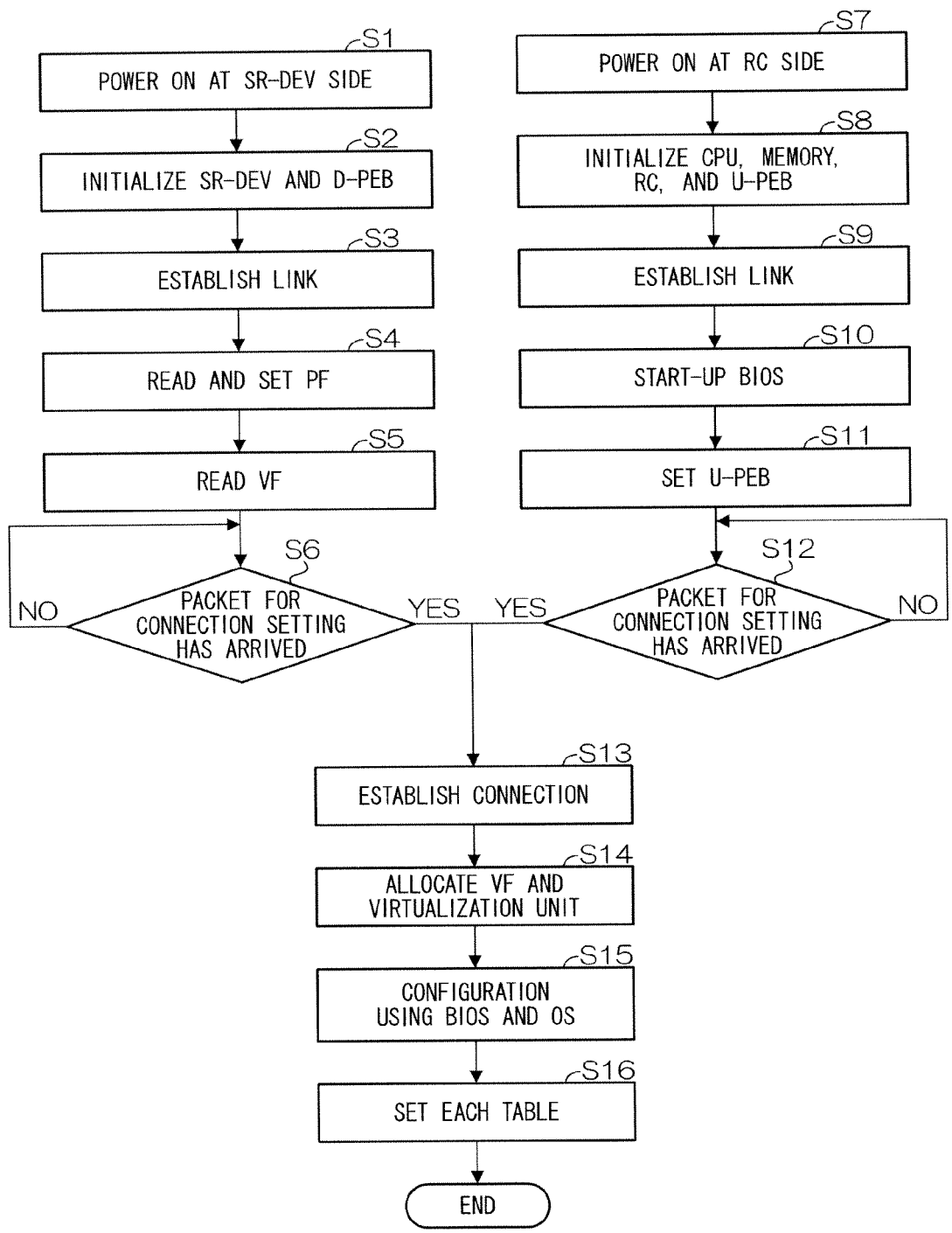
FIG. 5 is a flowchart illustrating the outline of an initial setting operation in the I/O system of the present exemplary embodiment.

FIG. 5 is a flowchart illustrating the outline of an initial setting operation in the I/O system of the present exemplary embodiment. The initial setting operation at the SR-DEV side starts in response to power-on at the SR-DEV side (step S1). That is, the D-PEBs 106 and the SR-DEVs 107 are initialized, and initial values are set in the configuration register 303, the PF 4021, and the VFs 4022 (step S2). Next, the physical link control and monitoring unit 309 sets and establishes PCI Express physical links between the D-PEBs 106 and the SR-DEVs 107 (step S3).

Then, the SR-DEV setting unit 3023 reads the initial value of the PF 4021 of the SR-DEV 107, and sets the PF 4021 in accordance with the value (step S4). Thereafter, the SR-DEV setting unit 3023 reads the initial values of the VEs 4022 of the SR-DEV 107, and sets the values in the virtualization units 3021 (step S5). Next, the connection management unit 306 transmits a packet for connection management, and waits until a packet for connection setting arrives from the U-PEB 104 (step S6).

On the other hand, in response to power-on at the RC side (step S7), the CPUs 101, the memories 102, the RCs 103, and the U-PEBs 104 are initialized and initial values are set in the configuration register 203 (step S8). Next, physical links are set and established between the RCs 103 and the U-PEBs 104 (step S9). Then, the BIOS is started-up on the CPUs 101 (step S10). The BIOS sets the U-PEB 104 (step S11). The connection management unit 206 of the U-PEB 104 transmits a control packet for connection management and waits until a packet for connection setting arrives from the D-PEB 106 (step S12).

Then, if the packets for connection setting arrive at the connection management unit 306 of the D-PEB 106 and the connection management unit 206 of the U-PEB 104 (YES of step S6 and YES of step S12), the connection management unit 206 and the connection management unit 306 establish a connection (step S13). If the connection is established, the SR-DEV 107 and the D-PEB 106 allocate an arbitrary VF 4022 and virtualization unit 3021 to the connection (step S14). Then, the D-PEB 106 and the SR-DEV 107 configure the BIOS and the OS, and set the configuration register 303, the allocated virtualization unit 3021 and VF 4022, a memory space, and an I/O space (step S15). In accordance with a result thereof, the conversion table 207, the conversion table 307, and the access conversion table 3022 are set (step S16), and the initial setting operation is completed.

Figure 6:
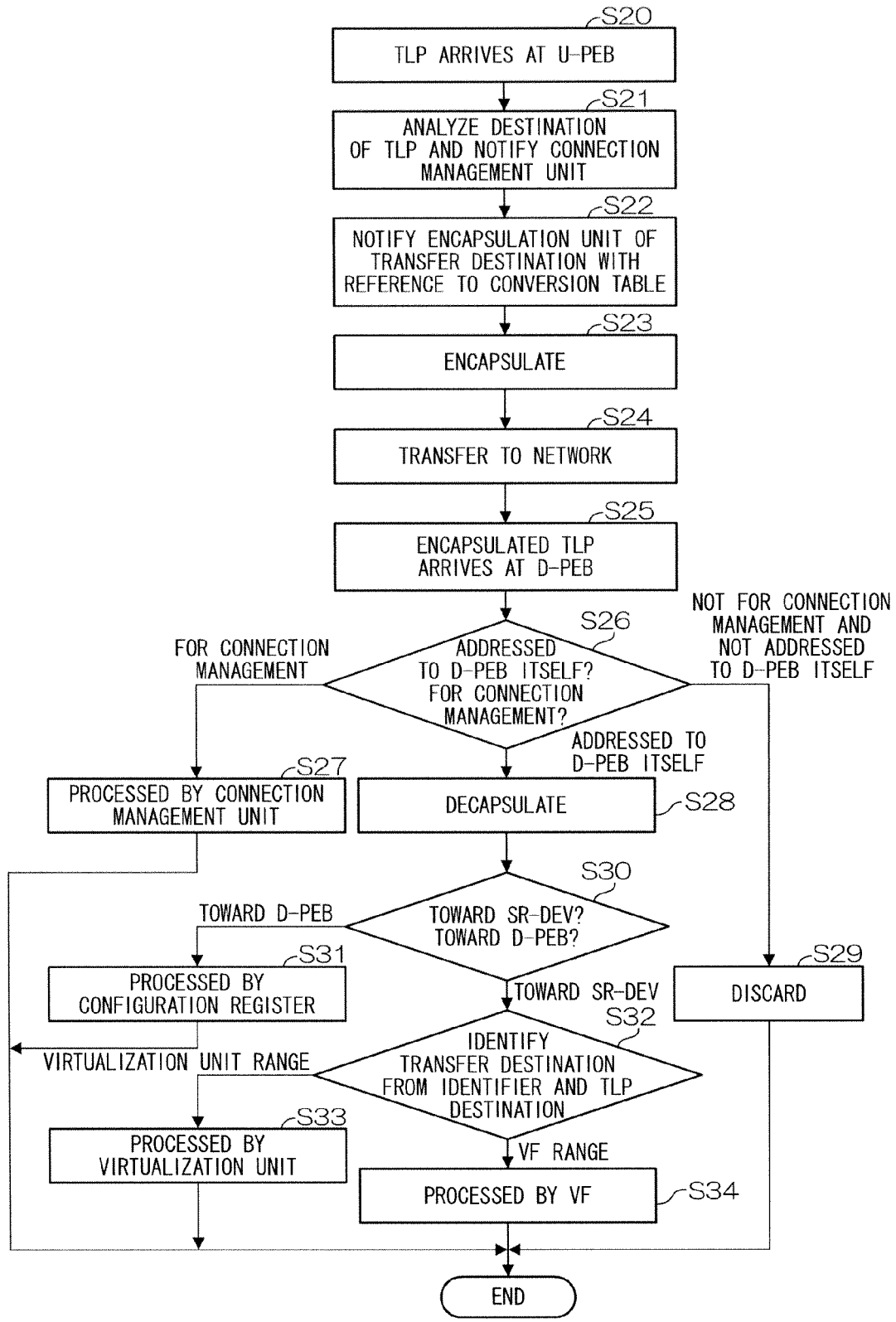
FIG. 6 is a flowchart illustrating an operation for transferring data from an RC side to an SR-DEV side in the I/O system of the present exemplary embodiment.
Figure 7:
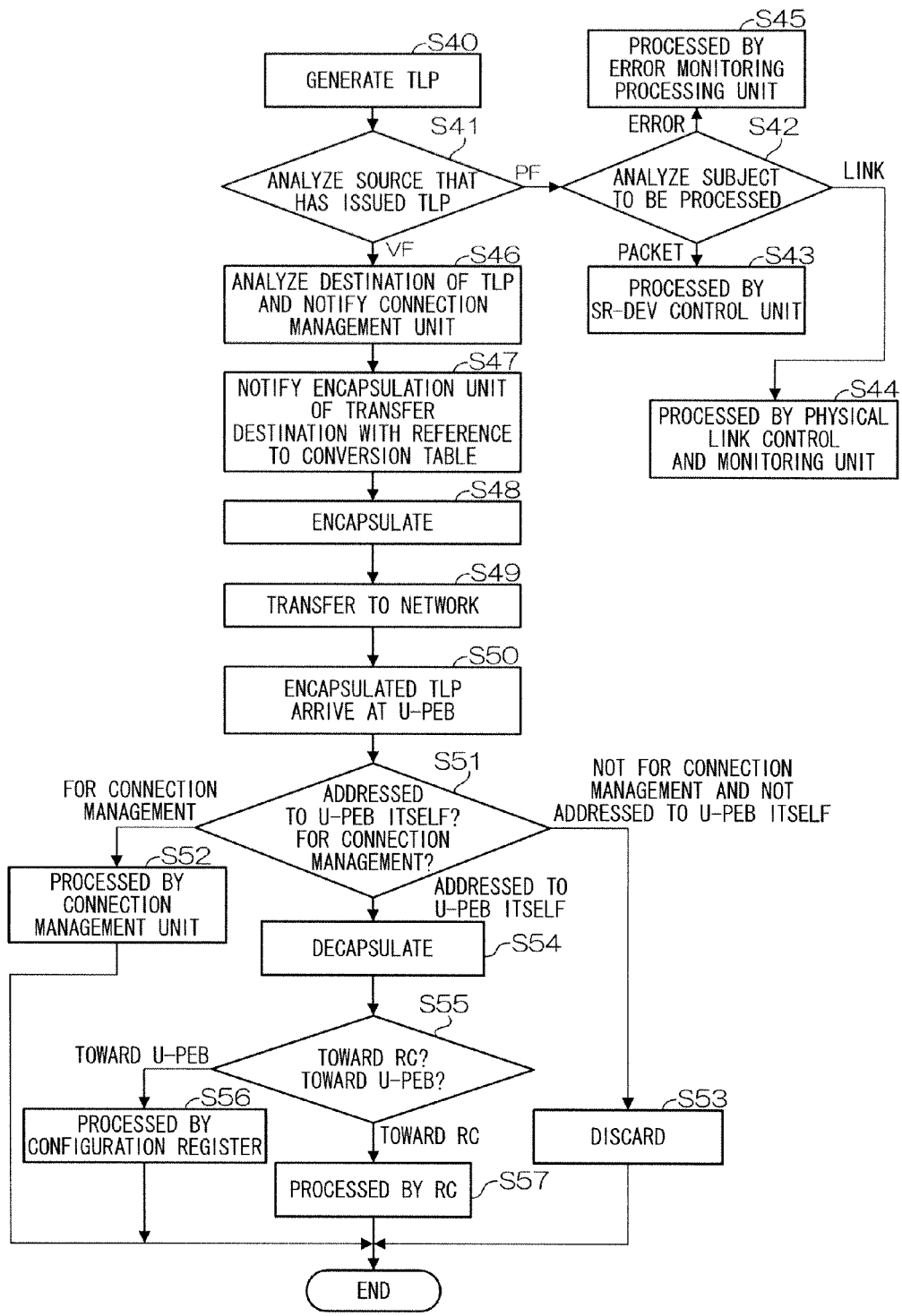
FIG. 7 is a flowchart illustrating an operation for transferring data from the SR-DEV side to the RC side in the I/O system of the present exemplary embodiment.

FIG. 6 and FIG. 7 are flowcharts illustrating data transfer operations after the initial setting of the I/O system of the present exemplary embodiment. FIG. 6 is a flowchart for data transfer from the RC side to the SR-DEV side. On the other hand, FIG. 7 is a flowchart for data transfer from the SR-DEV side to the RC side.

First, the case in which data is transferred from the RC side to the SR-DEV side will be described. In FIG. 6, the RC 103 transfers data which has been read from the memory 102 to the U-PEB 104 as a PCI Express transaction layer packet (TLP) (step S20). The PCIe processing unit 201 of the U-PEB 104 analyzes a destination of the TLP and notifies the connection management unit 206 of the result (step S21). Having received the notification, the connection management unit 206 notifies the encapsulation unit 202 of information on the transfer destination D-PEB 106 with reference to the conversion table 207 (step S22).

Then, the encapsulation unit 202 encapsulates the TLP to be transferred to the transfer destination D-PEB 106 through the network 105 (step S23), and transmits the encapsulated TLP to the network 105 (step S24). The encapsulated TLP passes through the network 105 and arrives at the target D-PEB 106 (step S25).

The filtering unit 304 identifies whether the encapsulated TLP that has arrived is addressed to the D-PEB 106 itself (step S26). If the encapsulated TLP is addressed to the D-PEB 106 itself, the filtering unit 304 transfers the encapsulated TLP to the decapsulation unit 305 (addressed to the D-PEB itself of step S26). On the one hand, if the encapsulated TLP is for connection management, the filtering unit 304 transfers the encapsulated TLP to the connection management unit 306 (for the connection management of step S26). On the other hand, if the encapsulated TLP is not addressed to the D-PEB 106 itself and is not for the connection management, the filtering unit 304 discards the encapsulated TLP (step S29).

The decapsulation unit 305 decapsulates the encapsulated TLP (step S28). Next, the decapsulation unit 305 identifies whether the destination of the TLP is the SR-DEV 107 or the D-PEB 106 (step S30). If the destination of the TLP is the D-PEB 106, the decapsulation unit 305 transfers the TLP to the configuration register 303 (toward the D-PEB of step S30). On the other hand, if the destination of the TLP is the SR-DEV 107, the decapsulation unit 305 transfers the TLP to the SR-DEV control unit 302 together with an identifier allocated to the RC 103 (toward the SR-DEV of step S30).

If the TLP is transferred to the configuration register 303, the transferred TLP is processed by the configuration register 303 (step S31). On the other hand, if the TLP is transferred to the SR-DEV control unit 302, the SR-DEV control unit 302 determines a transfer destination from the identifier allocated to the RC 103 and the destination of the TLP in accordance with access conversion table 3022 (step S32), and transfers the TLP to the virtualization unit 3021 or the VF 4022 of the SR-DEV 107 (a virtualization unit range or a VF range of step S32).

If the transfer destination is in the virtualization unit range, the TLP is processed by the virtualization unit 3021 (step S33). On the other hand, if the transfer destination is in the VF 4022 range, the TLP is passed through the PCIe processing unit 301 and the PCIe processing unit 401 and is processed by the VF 4022 (step S34).

Next, the case in which data is transferred from the SR-DEV side to the RC side will be described. In FIG. 7, the PF 4021 and the VF 4022 generate a UP (step S40). The TLP is passed through the PCIe processing unit 401 and the PCIe processing unit 301 and is transferred to the SR-DEV control unit 302. The SR-DEV control unit 302 analyzes a source that has issued the TLP that has arrived (step S41). If it is a TLP from the PF 4021 (PF of step S41), the SR-DEV control unit 302 analyzes a subject to be processed (step S42). The TLP is processed by the SR-DEV setting unit 3023 in the SR-DEV control unit 302 (step S43, in the case of a "packet" in step S42), by the physical link control and monitoring unit 309 (step S44, in the case of a "link" in step S42), or by the error monitoring processing unit 310 (step S45, in the case of an "error" in step S42) in accordance with the analyzed content.

On the other hand, if it is a TLP from the VF 4022 (VF of step S41), the SR-DEV control unit 302 analyzes a destination of the TLP with reference to the access conversion table 3022, and notifies the connection management unit 306 of information on the analyzed destination (step S46). The connection management unit 306 notifies the encapsulation unit 308 of a transfer destination U-PEB based on the information with reference to the conversion table 307 (step S47). Then, the encapsulation unit 308 encapsulates the TLP to be transferred to the transfer destination U-PEB 104 through the network 105 (step S48), and transmits the encapsulated TLP to the network 105 (step S49). The encapsulated TLP passes through the network 105 and arrives at the target U-PEB 104 (step S50).

The filtering unit 204 identifies whether the encapsulated TLP that has arrived is addressed to the U-PEB 104 itself (step S51). If the encapsulated TLP is addressed to the U-PEB 104 itself, the filtering unit 204 transfers the encapsulated TLP to the decapsulation unit 205 (addressed to the U-PEB itself of step S51). On the one hand, if the encapsulated TLP is for connection management, the filtering unit 204 transfers the encapsulated TLP to the connection management unit 206 (for the connection management of step S51). The transferred TLP is processed by the connection management unit 206 (step S52). On the other hand, if the encapsulated TLP is not addressed to the U-PEB 104 itself and is not for the connection management, the filtering unit 204 discards the TLP (step S53).

The decapsulation unit 205 decapsulates the transferred TLP (step S54). Next, the decapsulation unit 205 identifies whether the destination of the TLP is the RC or the U-PEB (step S55). If the destination of the TLP is the U-PEB 104, the decapsulation unit 205 transfers the TLP to the configuration register 203 (toward the U-PEB of step S55). The transferred TLP is processed by the configuration register 203 (step S56). On the other hand, if the destination of the TLP is the RC 103, the decapsulation unit 205 transfers the TLP to the PCIe processing unit 201 (toward the RC of step S55). The transferred TLP is transferred to the RC 103 and is processed (step S57).

Figure 8:
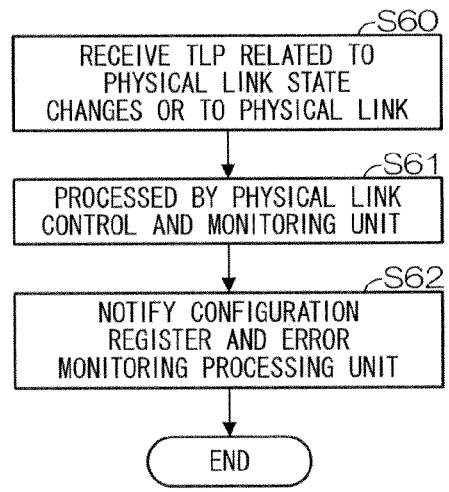
FIG. 8 is a flowchart illustrating an operation related to control and monitoring of a physical link in the I/O system of the present exemplary embodiment.

FIG. 8 is a flowchart illustrating an operation related to control and monitoring of a physical link after the initial setting in the I/O system of the present exemplary embodiment. When the initial setting is completed, the physical link control and monitoring unit 309 monitors a change in a state of a PCI Express physical link between the PCIe processing unit 301 and the PCIe processing unit 401, and the reception of a TLP related to a physical link from the PF 4021 of the SR-DEV 107 (step S60). If a change occurs in the state of the physical link or the TLP related to the physical link is received from the PF 4021, the physical link control and monitoring unit 309 performs a process corresponding to the change in the state of the PCI Express physical link, or a process corresponding to the received TLP related to the physical link (step S61), and notifies the configuration register 303 and the error monitoring processing unit 310 of a processing result (step S62).

Figure 9:
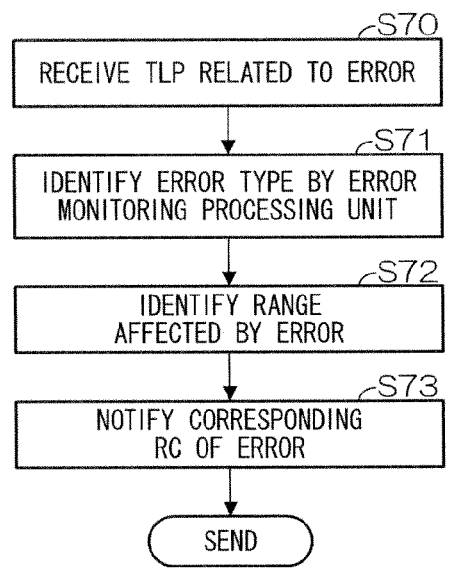
FIG. 9 is a flowchart illustrating an operation related to an error monitoring process in the I/O system of the present exemplary embodiment.
Figure 10:
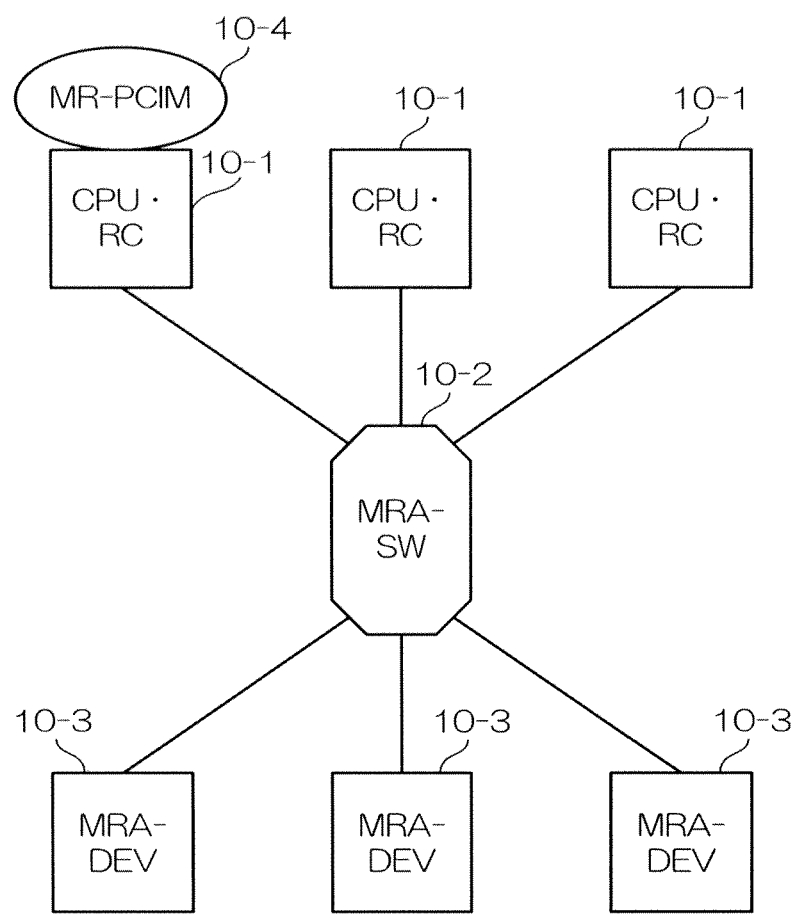
FIG. 10 is a block diagram illustrating an entire configuration of an MR-IOV system in accordance with a related art.

FIG. 9 is a flowchart illustrating an operation related to an error monitoring process after the initial setting in the I/O system of the present exemplary embodiment. When the initial setting is completed, the error monitoring processing unit 310 monitors the reception of a TLP related to an error from the PF 4021 of the SR-DEV 107 (step S70). If the TLP related to the error is received from the PF 4021, the error monitoring processing unit 310 identifies the type of the error (step S71), identifies a CPU/RC affected by the error (step S72), and notifies relevant RCs 103 of error information (that is, the identified error type) (step S73). Then, the error is processed by each RC 103.

As described above, in the above-mentioned exemplary embodiment, the plurality of upstream-side U-PEBs 104 are connected to the plurality of RCs 103, respectively. Furthermore, the plurality of downstream-side D-PEBs 106 are connected to the plurality of SR-DEVs 107, respectively. Moreover, the plurality of U-PEBs 104, the plurality of D-PEBs 106, and the network 105, which transfers information therebetween, constitute the virtual multi-root PCI Express switch (virtual MR-SW). Then, the plurality of D-PEBs 106 independently perform the setting of the connected SR-DEVs 107, the control and monitoring of the physical link, and the error monitoring process.

In addition, in the above-mentioned exemplary embodiment, the SR-DEV setting unit 3023 mounted in each D-PEB 106 connected to each SR-DEV 107 sets only the connected SR-DEV 107. Thus, even if a failure occurs, only the relevant D-PEB 106 and the SR-DEV 107 are affected. Consequently, when the SR-DEV 107 is shared by the plurality of RCs 103, an error status of the SR-DEV 107 can be monitored by the error monitoring processing unit 310 of the D-PEB 106 connected to the SR-DEV 107. Thus, it is possible to notify all the RCs 103 sharing the SR-DEV 107 of the error status. As a consequence, it is possible for each RC 103 to perform an appropriate error process, thereby improving fault tolerance of the 110 system.

Furthermore, in the above-mentioned exemplary embodiment, each SR-DEV 107 is set by the SR-DEV setting unit 3023 mounted in the D-PEB 106 connected to the SR-DEV 107. Thus, it is possible to reduce the time required for an MR-PCIM (not illustrated in FIG. 1) to set all I/O devices. Furthermore, it is possible to set the SR-DEV 107 before a network connection is established, thereby shortening the start-up time of the I/O system.

Moreover, in the above-mentioned exemplary embodiment, before the BIOS on the CPU/RC is started-up, the SR-DEV setting unit 3023 mounted in the D-PEB 106 connected to each SR-DEV 107 sets each SR-DEV 107. Thus, it is possible to use the SR-DEV 107 from the start-up of the BIOS.

While the present invention has been particularly shown and described with reference to exemplary embodiments thereof, the present invention is not limited to those exemplary embodiments. It will be understood by those of ordinary skill in the art that various changes in form and details may be made therein without departing from the spirit and scope of the present invention as defined in the claims.

For example, structural elements (e.g., the U-PEB 104 and the D-PEB 106) constituting the I/O system 1 may also be realized using a computer that executes a program for performing their functions. The computer reads and executes the program recorded on a computer-readable recording medium, thereby functioning as the structural elements. It is to be noted that the computer-readable recording medium includes a recording medium uch as a flexible disk, a magneto-optical disc, or a compact disc read only memory (CD-ROM), a storage device such as a hard disk device embedded in a computer system.

This application is based upon and claims the benefit of priority from Japanese Patent Application No. 2009-159704, filed on Jul. 6, 2009, the disclosure of which is incorporated herein in its entirety by reference.

INDUSTRIAL APPLICABILITY

The present invention can be used, for example, for an I/O system in which a PCI Express device is shared between a plurality of CPUs and a plurality of RCs. In accordance with the present invention, it is possible to improve fault tolerance, avoid a functional limitation at the time of start-up of the I/O system, and shorten a start-up time.

DESCRIPTION OF REFERENCE SYMBOLS

1 I/O system
101 CPU
102 memory
103 RC
104 U-PEB
105 network
106 D-PEB
107 SR-DEV
201 PCIe processing unit
202 encapsulation unit
203 configuration register
204 filtering unit
205 decapsulation unit
206 connection management unit
207 conversion table
301 PCIe processing unit
302 SR-DEV control unit
3021 virtualization unit
3022 access conversion table
3023 SR-DEV setting unit
303 configuration register
304 filtering unit
305 decapsulation unit
306 connection management unit
307 conversion table
308 encapsulation unit
309 physical link control and monitoring unit
310 error monitoring processing unit
401 PCIe processing unit
402 I/O control unit
4021 PF
4022 VF

The invention claimed is:
1. An I/O system comprising:
a plurality of single root-compatible PCI Express devices;
a plurality of root complexes which share the plurality of PCI Express devices;
a plurality of upstream PCI Express bridges connected to the plurality of root complexes, respectively;

a plurality of downstream PCI Express bridges connected to the plurality of PCI Express devices, respectively; and
a network through which data is exchanged between the plurality of upstream PCI Express bridges and the plurality of downstream PCI Express bridges,
wherein each of the plurality of downstream PCI Express bridges comprises:
a device control unit which performs a setting of each PCI Express device connected to each of the plurality of downstream PCI Express bridges itself before a BIOS is started-up on central processing units connected to the root complexes;
a physical link control and monitoring unit which controls and monitors a state of a physical link with each PCI Express device connected to each of the plurality of downstream PCI Express bridges itself; and
an error monitoring processing unit which performs monitoring and notification of an error of each PCI Express device connected to each of the plurality of downstream PCI Express bridges itself,
wherein the plurality of upstream PCI Express bridges, the plurality of downstream PCI Express bridges, and the network constitute a virtual multi-root PCI Express switch.

2. A downstream PCI Express bridge comprising:
a device control unit which performs a setting of a PCI Express device connected to the downstream PCI Express bridge itself, among a plurality of single root-compatible PCI Express devices shared by a plurality of root complexes connected to a plurality of upstream PCI Express bridges that exchange data with the downstream PCI Express bridge itself through a network before a BIOS is started-up on central processing units connected to the root complexes;
a physical link control and monitoring unit which controls and monitors a state of a physical link with the PCI Express device connected to the downstream PCI Express bridge itself; and
an error monitoring processing unit which performs monitoring and notification of an error of the PCI Express device connected to the downstream PCI Express bridge itself.

3. The downstream PCI Express bridge according to claim 2, wherein the error monitoring processing unit identifies a type of the error, identifies a root complex affected by the error, and notifies the identified root complex of the identified type of the error.

4. The downstream PCI Express bridge according to claim 3, wherein the device control unit sets a physical function PF and a virtual function VF of the PCI Express device connected to the downstream PCI Express bridge itself.

5. The downstream PCI Express bridge according to claim 4, wherein the device control unit sets the PCI Express device connected to the downstream PCI Express bridge itself before a network connection is established.

6. The downstream PCI Express bridge according to claim 3, wherein the device control unit sets the PCI Express device connected to the downstream PCI Express bridge itself before a network connection is established.

7. The downstream PCI Express bridge according to claim 2, wherein the device control unit sets a physical function PF and a virtual function VF of the PCI Express device connected to the downstream PCI Express bridge itself.

8. The downstream PCI Express bridge according to claim 7, wherein the device control unit sets the PCI Express device connected to the downstream PCI Express bridge itself before a network connection is established.

9. The downstream PCI Express bridge according to claim 2, wherein the device control unit sets the PCI Express device connected to the downstream PCI Express bridge itself before a network connection is established.

10. A method comprising:
performing, by a downstream PCI Express bridge, a setting of a PCI Express device connected to the downstream PCI Express bridge, among a plurality of single root-compatible PCI Express devices shared by a plurality of root complexes connected to a plurality of upstream PCI Express bridges that exchange data with the downstream PCI Express bridge through a network before a BIOS is started-up on central processing units connected to the root complexes;
controlling and monitoring, by the downstream PCI Express bridge, a state of a physical link with the PCI Express device; and
performing, by the downstream PCI Express bridge, monitoring and notification of an error of the PCI Express device.

11. A program that is embedded in a non-transitory computer readable medium and that causes a computer of a downstream PCI Express bridge to perform:
a device control function in which the downstream PCI Express bridge acts performs a setting of a PCI Express device connected to the downstream PCI Express bridge, among a plurality of single root-compatible PCI Express devices shared by a plurality of root complexes connected to a plurality of upstream PCI Express bridges that exchange data with the downstream PCI Express bridge through a network before a BIOS is started-up on central processing units connected to the root complexes;
a physical link control and monitoring function in which the downstream PCI Express bridge controls and monitors a state of a physical link with the PCI Express device; and
an error monitoring processing function in which the downstream PCI Express bridge performs monitoring and notification of an error of the PCI Express device.

* * * * *